United States Patent [19]

Schnellbacher et al.

[11] Patent Number: 4,787,321
[45] Date of Patent: Nov. 29, 1988

[54] SOLID WASTE CONVERSION PLANT

[75] Inventors: John J. Schnellbacher; Ray M. Mason, both of Houston, Tex.

[73] Assignee: Howbeit, Inc., Houston, Tex.

[21] Appl. No.: 31,082

[22] Filed: Mar. 26, 1987

[51] Int. Cl.⁴ .............................................. F23G 5/00
[52] U.S. Cl. .................... 110/258; 110/110; 110/116; 110/216; 110/256; 110/268; 110/293
[58] Field of Search ................. 110/203–207, 110/215–216, 229–230, 233–235, 254–259, 267–268, 286–288, 293, 301–304, 327–328, 108, 110, 118, 147–148, 162, 165 R, 344–346; 126/155

[56] References Cited

U.S. PATENT DOCUMENTS

| | | | |
|---|---|---|---|
| 3,520,649 | 7/1970 | Tomany et al. | 110/345 X |
| 3,557,724 | 1/1971 | Pan et al. | 110/258 X |
| 3,566,809 | 3/1971 | Carry et al. | 110/259 X |
| 3,785,304 | 1/1974 | Stookey | 110/118 X |
| 3,939,781 | 2/1976 | Adams | 110/257 X |
| 4,232,614 | 11/1980 | Fitch et al. | 110/235 |
| 4,384,534 | 5/1983 | Lamb et al. | 110/288 X |
| 4,508,039 | 4/1985 | Noguchi et al. | 110/258 |
| 4,628,828 | 12/1986 | Holtham et al. | 110/165 R |
| 4,642,048 | 2/1987 | Kim | 110/255 X |

Primary Examiner—Steven E. Warner
Attorney, Agent, or Firm—Kurt S. Myers

[57] ABSTRACT

The present invention is directed to a solid waste conversion plan for the conversion of such solid waste as old tires to a gas or liquid hydrocarbon product, wherein the partial pyrolysis of the solid waste is carried out in a reactor having a grate in the lower section and a plurality of rotating fingers extending through the grate for preventing compaction of the solid waste in the reactor. The reactor, a heat exchange means and a stripper are connected in series. A blower is positioned between the heat exchange means and stripper for drawing oxygen-containing gas into the reactor and removing the gases formed therein and passing those gases through the heat exchange means and into the stripper.

15 Claims, 4 Drawing Sheets

SOLID WASTE CONVERSION PLANT

FIELD OF INVENTION

The present invention is directed to a solid waste conversion plant for the conversion of such solid waste as old tires to a gas or liquid hydrocarbon product. More specifically, the partial pyrolysis of solid waste is carried out in a reactor having a grate in the lower section and a plurality of rotating fingers extending through the grate for preventing compaction of the solid waste in the reactor. The reactor, a heat exchanger and a stripper are connected in series. A blower is positioned between the heat exchanger and stripper for drawing oxygen containing gas into the reactor and removing the gases formed therein, and passing those gases through the heat exchanger and into the stripper.

BACKGROUND OF THE INVENTION

The incineration of refuse to form combustible gases which may be usefully burned or otherwise employed is disclosed in U.S. Pat. No. 1,598,380, issued in 1926.

In the 1970's, attention was directed to the conversion of scrap rubber, especially scrap tires, to produce fuel and other useful by-products. Examples of processes for burning or the pyrolysis of rubbers and specific equipment for carrying out the processes are disclosed in U.S. Pat. Nos. 3,890,141; 3,926,582 and 3,946,680. The process disclosed in U.S. Pat. No. 3,890,141 first heats the solid waste in contact with a hydrocarbon liquid to convert the solid waste to a fluid. In the process and apparatus disclosed in U.S. Pat. No. 3,926,582, the solid waste material is introduced to a substantially vertical pyrolysis chamber, having a vertical core member, which charges an oxygen-rich gas into the chamber at a plurality of vertically spaced points. The charging of the oxygen rich gas is controlled to maintain incomplete combustion of the waste organic component and form a combustible gas and an organic-free molten refractory material. The apparatus disclosed in U.S. Pat. No. 3,946,680 specifically utilizes, in each of the embodiments, a non-combustible particulate material, formed of steel, aluminum, ceramic material, etc., which provides a bed over which the meltable waste is burned. Either a grate provided with a shaker means or a travelling grate is disclosed.

Considerable attention has been directed to the furnace or pyrolyzing apparatus. Handling of the solid waste poses problems which have been solved in very different ways. U.S. Pat. No. 4,387,652 discloses a plurality of downwardly inclined screw conveyors disposed in troughs to handle the steel wire in the residue from the pyrolytic heating of tires. The apparatus disclosed in U.S. Pat. No. 4,401,513 utilizes a "tote bin" which is specifically designed to be introduced into the oven or furnace on rails. The apparatus disclosed in U.S. Pat. No. 4,452,154 provides a number of leakage-sealing dampers in a vertical furnace to cause the tires to descend progressively, causing the lower tires to undergo oxidative combustion, dry distilling the upper tires with the combustion gases, and collecting gaseous fuel and/or liquid fuel from the combustion and distillation. The thermal decomposition furnace for waste tires disclosed in U.S. Pat. Nos. 4,565,138 and 4,572,082 have a fluidized bed-forming section and below that section, a sealing bed-forming section having a smaller diameter than that of the fluidized bed-forming section. Refractory material is utilized in the fluidized bed and effectively seals the lower section.

The pyrolitic apparatus disclosed in U.S. Pat. Nos. 4,109,590 and 4,507,174 illustrate the extremes of the prior devices and methods used when utilizing air. The apparatus disclosed in U.S. Pat. No. 4,109,590 requires an air-starved hot moving grate carbonizer furnace and then further, a shaft furnace. In the pyrolytic apparatus disclosed in U.S. Pat. No. 4,507,174, it is disclosed that: "After the door is closed no additional air or oxygen is provided in the reaction chamber . . . "

The present invention overcomes the many disadvantages and problems of the prior patents by providing a structure which easily handles solid waste, such as old tires, and controls the pyrolysis when using air as the pyrolysis heating gas.

SUMMARY OF THE INVENTION

The present invention is directed to a solid waste conversion plant which comprises a reactor, a heat exchanger, and a stripper connected in series and characterized by a blower positioned between the heat exchanger and stripper drawing a pyrolysis heating gas, preferably air, into the reactor. The blower further removes the gases formed in the reactor and passing those gases through the heat exchanger and into the stripper. Further, the present invention is directed to a reactor which has a fixed grate structure which includes a fixed grate and a plurality of agitators extending through the grate to prevent compaction of the waste materials on the grate. Still further, the present invention is directed to a reactor which provides a controlled flow of pyrolysis heating gas, preferably air, which can be easily controlled so that the incoming flow is shut off without stopping the blower. Thus, dangerous conditions within the reactor are minimized and/or eliminated. All of the features of the present invention provide an improved solid waste conversion plant which may be easily scaled for handling of solid waste, such as old tires. The nature, utility, and further specific features of the present invention will be more clearly apparent from the following detailed description with respect to a preferred embodiment thereof when when read in conjunction with the accompanied drawings, briefly described below.

DETAILED DESCRIPTION OF THE INVENTION

Figure 1:
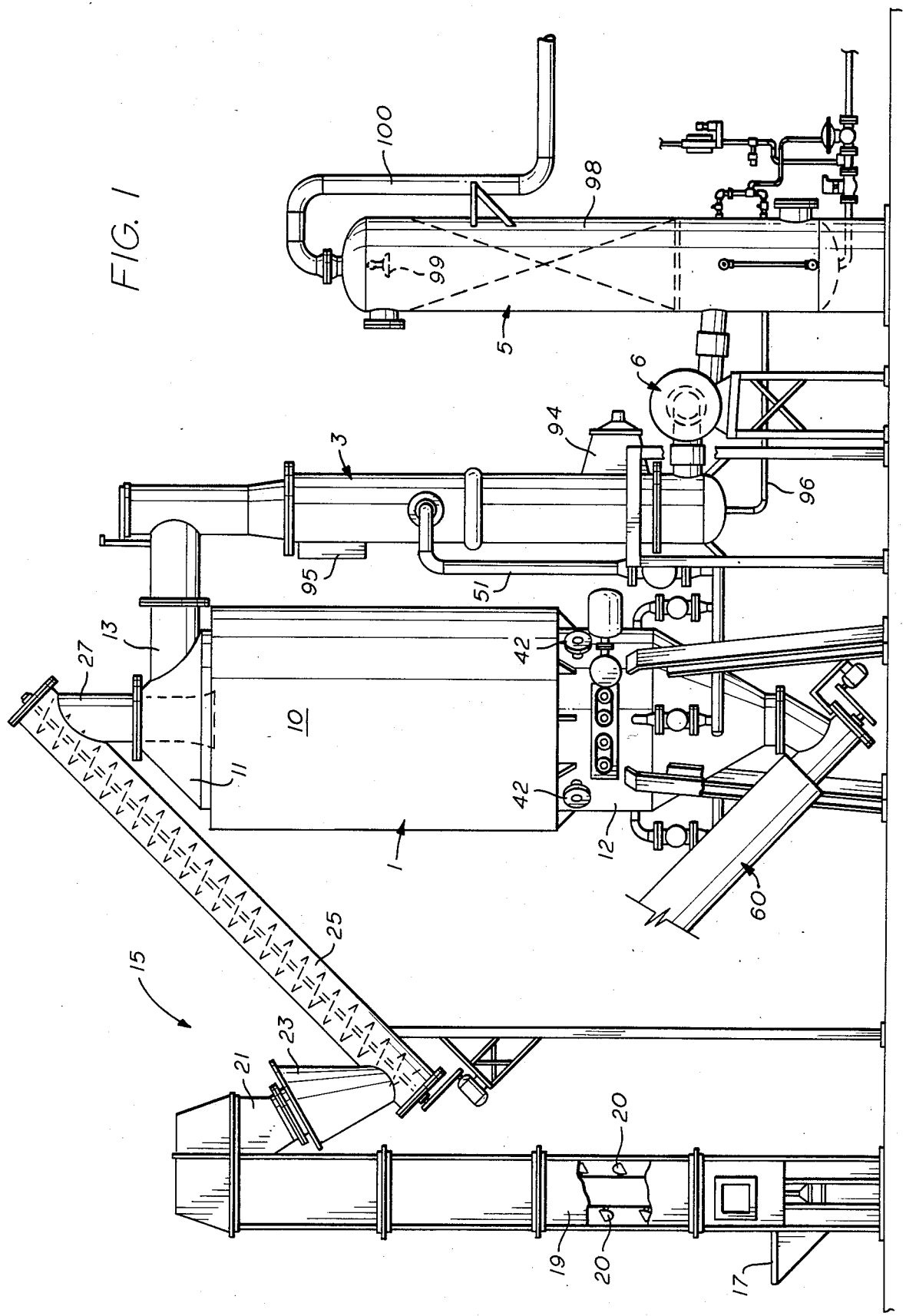
FIG. 1 is an elevational view, with parts shown in vertical section, showing the essential parts and structural organization of a solid waste conversion plant as illustrated by one specific example of the apparatus according to this invention.

The handling of solid waste, such as old tires, according to this invention, can be practiced by means of the apparatus of the invention, one example of which is shown in FIG. 1. Broadly considered, the waste conversion plant of the present invention comprises a reactor, 1, the details of which will be set forth hereinafter. The gases formed in reactor 1 are removed from the top and are passed to a heat exchanger 3. The heat exchanger 3 is more specifically a condensor for cooling the gases formed in the reactor 1. The cooled gases and condensed liquids are then removed from the other end of the heat exchanger 3, and passed to a stripper 5. The stripper 5 separates the condensed liquids from the cooled gas stream. The reactor 1, the heat exchanger, 3 and the stripper 5, are thus connected in series. One aspect of the present invention is that a blower 6, is connected between the heat exchange 3, and the stripper 5, which provides the means for removing the gases formed in reactor 1, and drawing those gases through the heat exchanger 3, and passing them into the stripper 5.

While the details are not shown in FIG. 1, the liquid stream from the stripper 5, as well as the gas stream from stripper 5, may be burned as a fuel in a boiler for the generation of steam used in producing electrical energy. Thus the solid waste conversion plant of the present invention may be the source of fuel in a cogeneration electrical plant.

The reactor 1, has a vertical furnace structure 10, in the form of a hollow tower with a cross sectional shape preferably of a circle, however, it may be square, oblong, rectangular, or some other form. This furnace structure 10, has a generally upper portion 11, which includes a closure structure and a lower portion 12. In the upper portion 11 of the furnace structure 10, are feeding means, which will be described in more detail hereinafter, generally including an inlet pipe, as well as a pipe 13 connected to the upper portion 11 for passing gases from reactor 1, to the heat exchanger 3.

The feeding means 15, as shown, are for old tires which have been split and chopped. Old tires which have been already cut in fairly uniform pieces are introduced into hopper 17 and then into a bucket elevator 19. The elevation 19 has a plurality of individual buckets 20, each of which take a scoop of chopped tires to the top of elevator 19. As the chain of buckets goes over the top, each bucket 20 empties the chopped tires which fall through the outlet 21 into the seal 23. The seal 23 acts as a feed to the screw conveyor 25. The seal 23, which may contain water, provides a gas seal so that air cannot be introduced with the rubber chips into the conveyor 25. The solid rubber chips fall into the inlet of the screw conveyor 25 and are conveyed into the top, where they fall out into pipe 27, which uniformly introduces them into reactor 1.

Figure 2:
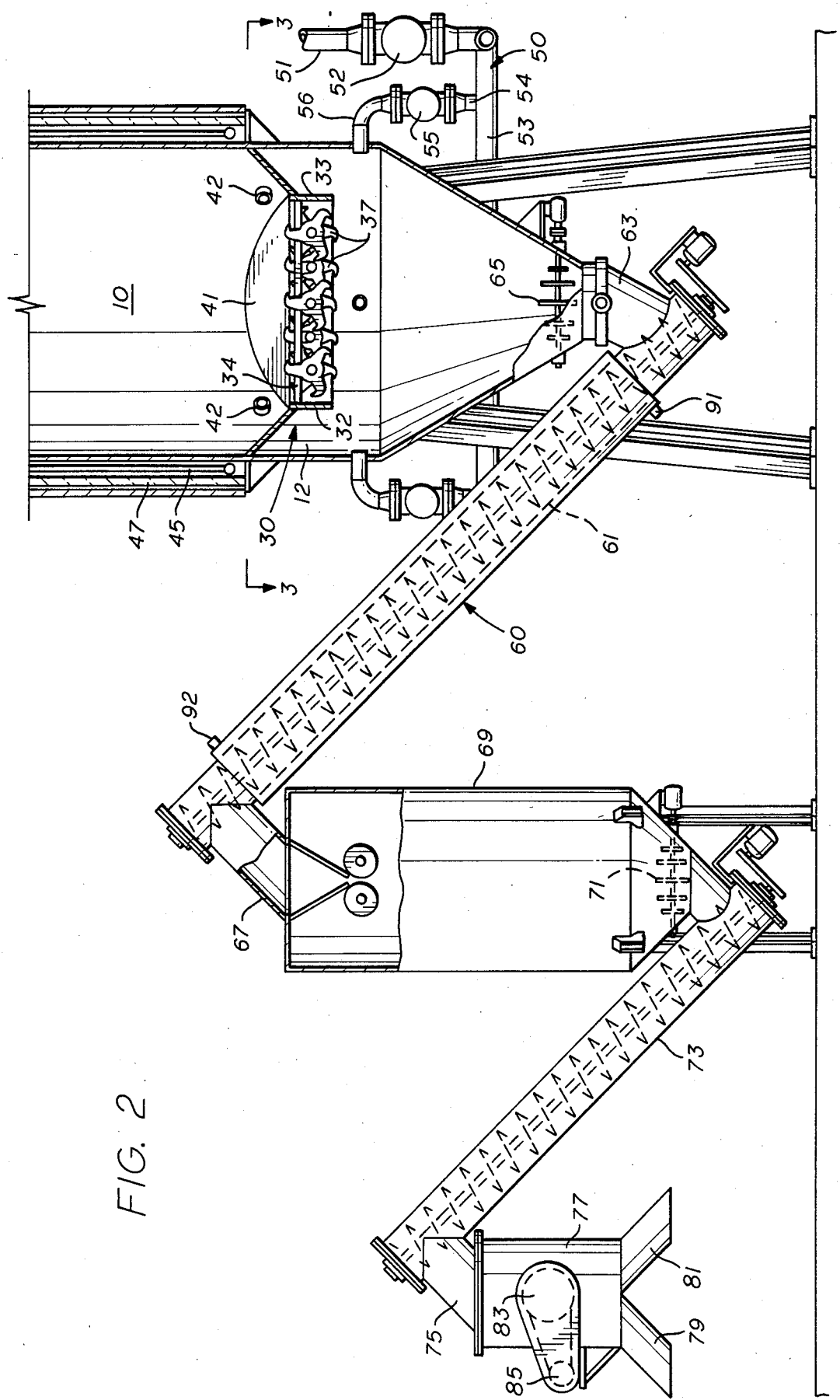
FIG. 2 is an elevational view, with parts shown in vertical section, showing the lower portion of the reactor and the details of one example of the ash removal portion of the apparatus which was only partially illustrated in FIG. 1.
Figure 3:
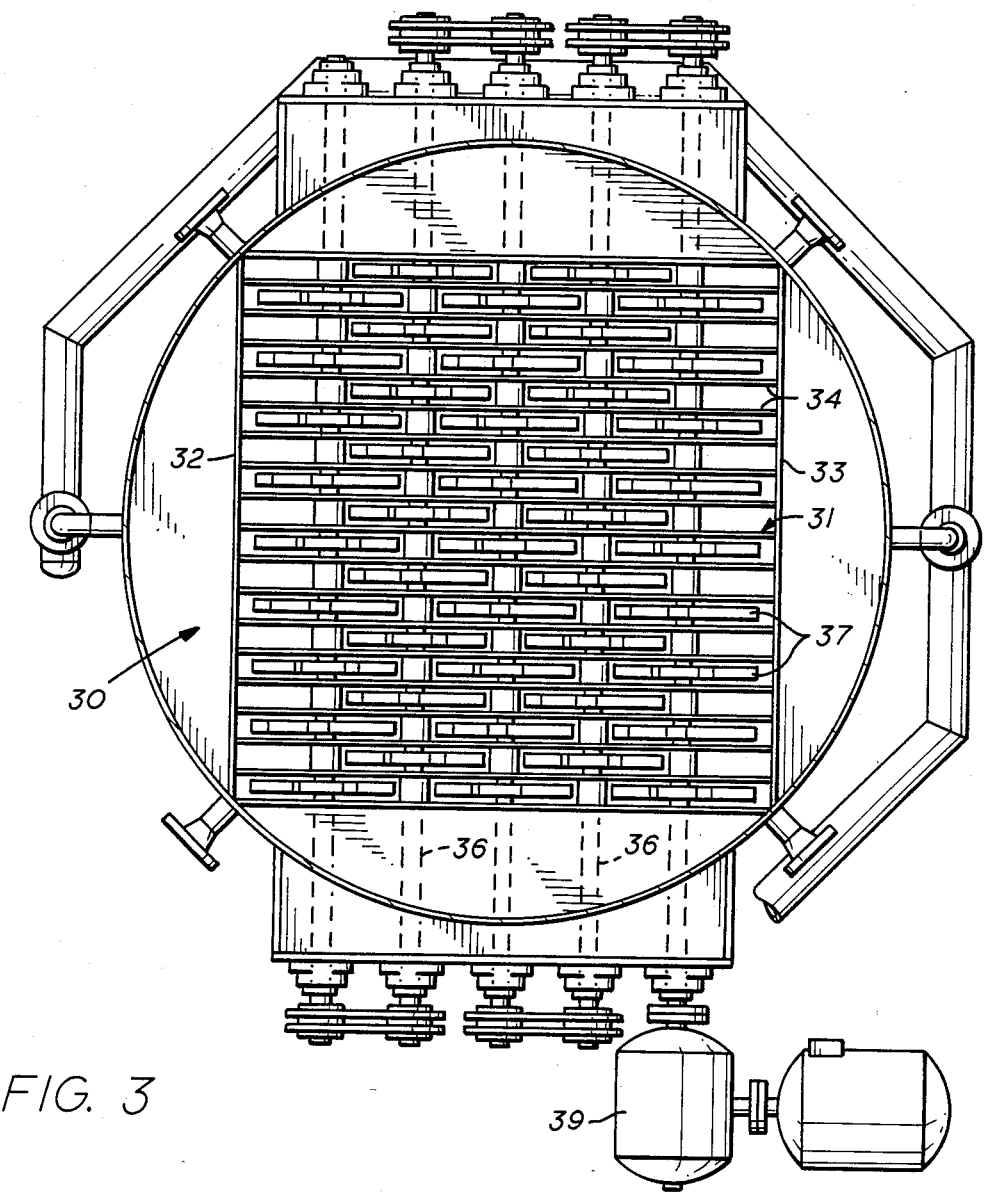
FIG. 3 is a cross section taken along line 3—3 in FIG. 2.

Referring now to FIGS. 2 and 3, in the lower portion 12 of reactor 1, is a grate structure generally referred to as 30. As seen in FIG. 3, the grate structure 30 includes a fixed grating 31, in the general shape of a square, fitting within the circular cross section of the furnace structure 10. The fixed grating 31 comprises one side 32 and an opposite side 33 to which a plurality of bars 34, spaced as showing FIG. 3. A plurality of shafts 36 run perpendicular to the fixed bars 34 and, as illustrated in FIGS. 2 and 3, there are five shafts 36.

Figure 4:
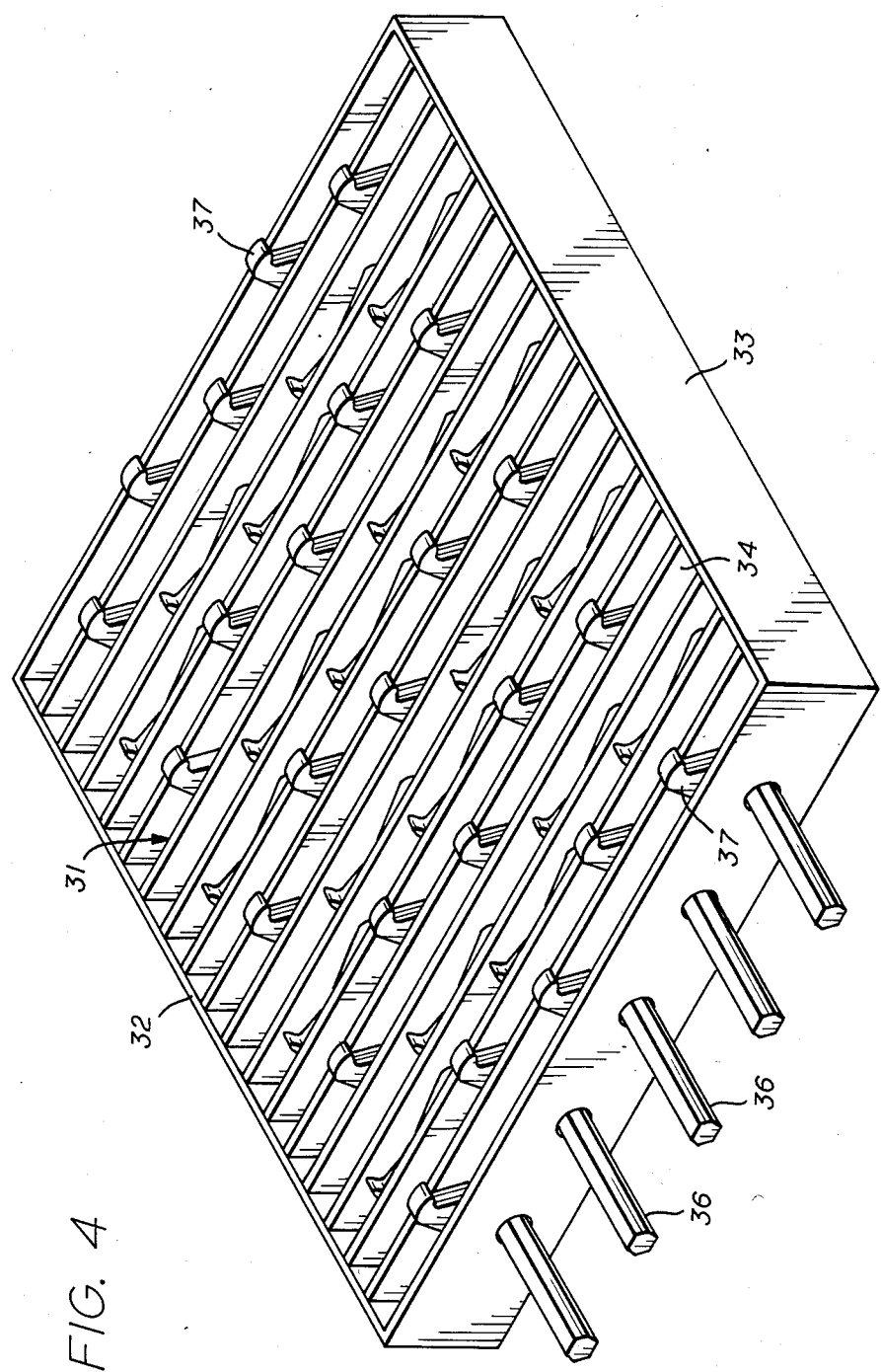
FIG. 4 is an isometric view of one example of a grate structure according to this invention.

The shafts 36 are preferably hexagonal in cross-section. On each of the shafts 36 are a plurality of fingers or agitators 37. Each of the agitators is preferably a tri-fingered configuration as shown in FIG. 2. Each finger extends at about 120° to each other and each finger has the same shape. The tri-fingered agitators 37 are attached to the shafts through the hexagonal opening in the middle of each agitator 37. Spacers are placed between each agitator 37 on same shaft, so that the agitators 37 have the configuration as shown in FIG. 3. Specifically, the outer shafts 36 and the middle shaft 36 will have agitators 37 spaced within the confines of two bars 34, extending between the sides 32 and 33. As illustrated in FIG. 4, a fingers of one agitator will extend upright and then on the same shaft 36, the finger of the next agitator 37 will be rotated and placed on the hexagonal shaft at essentially 45° to the next adjacent agitator 37. Each agitator 37 on the same shaft will be alternated in the positioning of the fingers. On the same shaft 36, agitators 37 are positioned in alternate spaces formed by the bars 34 extending between sides 32 and 33, as shown in FIG. 3. In the alternate spaces, two agitators 37 are positioned on the second and fourth shafts 36. Again agitators 37 and spaces are alternated and alternating the positioning of the fingers of the agitators 37 on the same shaft 36. With this configuration as illustrated in FIG. 4, two rows of agitators 37 have fingers up above the fixed grate 31, and as those agitators 37 are rotated downwardly, the fingers of the agitators 37 of the next two will extend above the top of the bars 34. With this configuration there are always agitators 37 extending above the fixed grate 31.

The purpose of the rotating agitators 37 is to maintain the bed of solid waste in constant agitation. Still further, the fingers take the ash from the burning rubber and constantly remove it as a solid which is broken against the fixed grate into small pieces. The agitation and breaking of the burnt waste assures that the ash easily flows and passes through the fixed grate 31. The shafts 36 are turned by a motor 39. In the pulley arrangement as illustrated in FIG. 3, all of the shafts may be driven by the same motor 39 and rotated in the same direction. Above the fixed grate 31 are four plates 41 which moves the material from the circular cross section and brings it to the square cross section of the fixed grate 31.

As illustrated in FIGS. 1 and 2, there are a plurality of portholes 42 which give access to that area just above the fixed grate 31. It is through these portholes that the solid waste can be ignited by any variety of ways. A convenient way of initiating combustion of the waste is to extend a butane burner into the mass of solid waste. The initiation may be through one or more of the ports 42. The portholes 42 are of a man size, both for the ease of initiation as well as for cleaning or removing material after the operation of the furnace 10.

As illustrated in FIG. 2, the walls of the furnace structure 10 above the grate structure 30 may be jacketed. With this construction, the walls of the furnace structure may be made from stainless steel and do not require any refractory material. The jacketed structure may comprise a plurality of heat exchange tubes 45 which will contain water for heating to produce steam. On the outer side of the heat exchange tubes 45, may be insulation 47. This jacketed portion of the furnace 10 will usually be above the grate and may extend essentially to the upper portion 11 of the furnace structure 10. With the jacketed walls, the heat produced in furnace structure 10 may be utilized to create hot water or steam, which is then used in the boilers as feed water. All of the energy of the burning of the waste solids is used as much as possible.

An air plenum is located in the lower portion of the furnace structure 10. As illustrated in FIG. 2, the plenum 50 is made up of an inlet pipe 51 having a valve 52. The inlet pipe 51 is connected to a circular plenum 53 having a plurality of inlets 54. In each inlet 54, four being illustrated in the illustrated example, is an individual valve 55. Each inlet 54 has an inlet pipe 56 which extends into the lower portion of the furnace structure 10. Each inlet pipe 56 is below the grate structure 31. The purpose of placing the inlets below the grate are to obtain the uniformity of the flow of air through the grate as well as contacting the ash as it falls through the grate 31 to make sure that it is completely combusted as well as providing some cooling to the ash as it falls through the grate.

As illustrated in FIG. 1, the inlet pipe 51 may be connected to the heat exchanger 3 for the air to be partially heated before bringing it in to the furnace structure 10. According to the present invention, the preheating is an alternative; however, the control of the amount of air may be regulated by the individual valves 55. The valve 52 is preferably a butterfly valve which may be quickly closed. All of the valves 52 and 55 may have automatic controls preferably controlled by heat points which may be located at several levels within the furnace structure 10.

According to the present invention, the blower 6, which is between the heat exchanger 3 and the stripper 5, is the motive force for drawing the air into the inlet pipe 51 and circular plenum 53 and through the individual inlets 56 into the furnace structure 10. The main purpose of the blower 6, however, is to remove the gases formed in reactor 1. The control of the blower 6 is to prevent any pressure build up in the reactor 1. The control of the air is not accomplished by the blower or pump as much as by adjusting ay of the valves 55. More importantly, if there are any problems in the furnace structure 10, the single valve 52 is closed so that the air or pyrolysis heating gas is immediately shut off; however, the gases within the furnace structure 10 are continuously removed since the blower 6 is not shut off. This structure provides substantial improved control and does not permit a runaway burning condition to occur.

The feeding means 15 includes a seal 23, so that air is only introduced through the individual inlets 56 and in no other way is air or oxygen permitted within the furnace structure 10. The same care is also taken with regard to the ash removing structure, generaly indicated as 60.

The ash removing structure 60 comprises a screw conveyor 61 which takes the ash from the lower portion of the furnace structure 10. Between the lower portion and the screw conveyor 61 is a seal 63. Above the seal 63 is a rotating breaker device 65 for breaking the ash into small pieces, or a powder. The ash passes from the lower portion 12 of the furnace structure 10 through the seal 63 into the screw conveyor 61. The ash then falls out of an outlet 67 into a retaining tank 69. This tank also has at the bottom a beater device 71 for breaking the ash before it is introduced into another screw conveyor 73. The screw conveyor 73 takes the ash to an outlet 75 where the ash falls into a separator 77 which may have a magnet on one side for separating any metal, which is removed by leg 79, from the ash which is removed by leg 81. The ash may be generally agitated in the separator 77 by a rotating drum 83 driven by a motor 85.

In FIG. 2, the screw conveyor 81 has a jacket wherein water may be introduced by inlet 91 and removed by outlet 92. The jacketing of conveyor 81 permits utilizing the heat in the ash to heat the water. This heated water may be then introduced into the heat exchange tubes 45 in the jacketed wall structure of reactor 1.

By using two screw conveyors (61 and 73) and holding tank 69 the ash is cooled substantially before the ash comes into contact with any oxygen or air. This makes certain that there is no possibility of conditions for spontaneous combustion within the ash. By using the jacketed conveyor 61, the heat is fully utilized by heating the water. Preferably, the water is heated further in the reactor, especially in the case where the waste conversion plant of the present invention is utilized in conjunction with a cogeneration of electricity plant.

With the apparatus of the present invention, the usual very high temperatures which some of the prior art taught are avoided. Suitable gases for combustion have been produced at temperatures measured in the furnace structure 10 just above the grate 31 as low as 150° F. A preferred range may be within the range of 150° to 700° F. Temperatures above 1,200° are avoided.

To illustrate the low temperatures at which the present apparatus may be run to obtain suitable gas for combustion old tires were burned in the following runs (temperatures measured just above the grate):

| Run #1 - 160° F. | | |
|---|---|---|
| Analysis: | Mol % | GPM at 14.650 psia |
| Methane | 15.306 | |
| Ethane | 9.745 | 2.592 |
| Propane | 12.602 | 3.454 |
| Iso-butane | 30.255 | 9.844 |
| N—butane | 1.276 | 0.400 |
| Iso-pentane | 2.092 | 0.761 |
| N—pentane | 0.306 | 0.110 |
| Hexanes | 28.418 | 11.624 |
| | 100.000 | 28.785 |

Specific Gravity at 60 deg. F. (air = 1) 1.9807
Calculated B.T.U./cu. ft. @ 14.650 psia and 60 deg. F.
Dry basis 3214
Wet basis 3158

| Run #2 - 560° F. | | |
|---|---|---|
| Analysis: | Mol % | GPM at 14.650 psia |
| Methane | 7.762 | |
| Ethane | 5.304 | 1.411 |
| Propane | 13.066 | 3.581 |
| Iso-butane | 25.162 | 8.187 |
| N—butane | 0.970 | 0.304 |
| Iso-pentane | 2.199 | 0.800 |
| N—pentane | 0.517 | 0.186 |
| Hexanes | 45.020 | 18.415 |
| | 100.000 | 32.884 |

Specific Gravity at 60 deg. F. (air = 1) 2.3366
Calculated B.T.U./cu. ft. @ 14.650 psia and 60 deg. F.
Dry basis 3765
Wet basis 3699

In the foregoing analysis ethane includes ethane, ethylene and acetylene. Propane includes propane, propylene and propadene. Iso-butane includes iso-butane and butenes. Iso-Pentane includes iso-pentane and pentenes. The oil obtained in run #2 had an API gravity at 60° F. of 16.5 and a color which was dark straw. In carrying out the ASTM distillation (D-86) the initial boiling point was 186° F. with 5% recovered at 357° F. and 80% recovered at 678° F. With the endpoint temperature of 678° F. the recovery was 80 volume percent, residue, 19 volume percent with a loss of 1 volume percent.

The foregoing tests results were made in a test unit that did not have a heat exchanger with forced air circulation as illustrated in FIG. 1. As illustrated in FIG. 1 heat exchanger 3 has a blower 94 for forcing air into the heat exchanger which is passed in a serpentine path to outlet 95. The gases formed in the reactor 1 are cooled and some gases condensed in heat exchanger 3. The cooled gases and condensed liquids are forced by blower 6 out of the bottom of heat exchanger 3 into stripper 5. A pipe 96 connects the bottom of heat exchanger 3 to take condensed liquids and pass them directly to stripper 5. As shown in FIG. 1, stripper 5 has an upper portion 98 which is packed with rings, flex rings preferrably made of steel or other material to aid in the condensing of liquids in the cooled gases. Furthermore a cooled stream of the oil removed at the bottom of stripper 5 may be circulated and introduced at the top of stripper 5 by sprayhead 99.

The removal of the oil from the bottom of stripper 5 and the gas stream from the upper portion by pipe 100 may be done in any conventional manner known to the art. In its preferred utilization the conversion plant of the present invention is used in conjunction with a cogeneration plant for the production of electricity. The oil and gas produced in the conversion plant may be burned in a boiler for producing steam which is then used to drive generators for the generation of electricity.

Although the invention is described with respect to a specific embodiment, the details thereof are not to be construed as limitations except to the extent indicated in the following claims.

We claim:

1. A conversion plant for solid waste comprising:
   a reactor having an upper section and a lower section, a heat exchange means and a stripper connected in series,
   means for introducing said solid waste to said reactor,
   grate structure means in said lower section of said reactor,
   said grate structure means includes a fixed grate and a plurality of rotating fingers extending through said grate for preventing compaction of the solid waste in said reactor,
   pyrolysis heating gas distributor means below said grate means; and
   blower means positioned between said heat exchange means and said stripper for drawing said heating gas into said reactor and removing the gases formed and passing the gases through said heat exchange means and into said stripper.

2. A conversion plant according to claim 1 wherein said means for introducing said solid waste comprises conveyor means.

3. A conversion plant according to claim 1 wherein said introducing means further includes a gas seal.

4. A conversion plant according to claim 1 which further includes means at the bottom of said reactor for removing ash from said reactor.

5. A conversion plant for solid waste comprising:
   a reactor, heat exchange means and a stripper connected in series;
   agitator means in said reactor, said agitator means including a fixed grate and a plurality of rotatable agitators with fingers which extend through said grate for preventing compaction of said solid waste above said grate;
   conveyor means having a gas seal for introducing said solid waste to said reactor and above said agitator means;
   oxygen-containing gas distributor means in said lower section of said reactor below said agitator means; and
   blower means positioned between said heat exchange means and stripper for drawing oxygen-containing gas into said reactor and removing gases formed in said reactor through said exchange means and into said stripper.

6. A conversion plant for solid waste comprising:
   a reactor;
   agitator means in said reactor for preventing compaction of the solid waste in said reactor, said agitator means including a fixed grate and a plurality of rotatable agitators with fingers which extend through said grate for preventing compaction of said solid waste above said grate;
   gas distributor means below said agitator means;
   means for introducing said solid waste above said agitator means;
   blower means for drawing an oxygen-containing gas into said reactor through said gas distributor means; and
   means for cooling the gases formed in said reactor.

7. A conversion plant according to claim 6 wherein said introducing means includes a conveyor.

8. A conversion plant according to claim 6 wherein said introducing means further includes a gas seal.

9. A conversion plant according to claim 6 which further includes auger means at the bottom of said reactor for removing ash from said reactor.

10. A conversion plant according to claim 9 wherein said blower means is located at the outlet of said cooling means.

11. A conversion plant for waste tires comprising:
    a reactor having an upper section and a lower section;
    agitator means in said lower section of said reactor for preventing compaction of said tires in said reactor;
    said agitator means includes a fixed grate and a plurality of rotatable agitators with fingers which extend through said grate for preventing compaction of said solid waste;
    oxygen-containing gas distributor means below said agitator means;
    means for introducing said waste tires to said reactor;
    heat exchange means for cooling the gases removed from said reactor, said heat exchange means having an inlet and an outlet;
    means for connecting said upper section of said reactor to said inlet of said heat exchange means; and
    stripper means connected to the outlet of said blower means for separating the cooled gases from the condensed liquids.

12. A conversion plant according to claim 11 wherein said introducing means includes a conveyor.

13. A conversion plant according to claim 11 wherein said introducing means further includes a gas seal.

14. A conversion plant according to claim 11 wherein said stripper means includes a packed tower.

15. A conversion plant according to claim 11 which further includes means at the bottom of said reactor for removing ash from said reactor.

* * * * *